United States Patent [19]

Takiguchi et al.

[11] Patent Number: 4,597,484

[45] Date of Patent: Jul. 1, 1986

[54] SYNCHRONIZER RING IN VEHICLE SPEED CHANGE GEAR

[75] Inventors: Hiroshi Takiguchi; Yoshikatu Sugiyama, both of Kanagawa; Ryoji Hosoya, Yokosuka, all of Japan

[73] Assignee: Kyowa Works Co., Ltd., Kanagawa, Japan

[21] Appl. No.: 594,775

[22] Filed: Mar. 26, 1984

[30] Foreign Application Priority Data

Apr. 6, 1983 [JP] Japan ................... 58-60614

[51] Int. Cl.⁴ .................. F16D 13/24; F16D 13/66
[52] U.S. Cl. ................... 192/70.15; 192/53 F; 192/107 M
[58] Field of Search .............. 192/70.15, 70.12, 70.2, 192/70.17, 70.18, 107 M, 53 F

[56] References Cited

U.S. PATENT DOCUMENTS

| 4,267,912 | 5/1981 | Bauer et al. | 192/53 F |
| 4,314,627 | 2/1982 | Nozawa | 192/53 F |
| 4,418,115 | 11/1983 | Le Lannou | 192/107 M X |

Primary Examiner—Edward G. Favors
Attorney, Agent, or Firm—Michael J. Striker

[57] ABSTRACT

A synchronizer ring in a vehicle speed change gear, including a ring body having a clutch surface and a resin formed layer disposed on the clutch surface of the ring body and having both circumferential and axial directions in which are disposed both circumferential and axial grooves that cross each other.

12 Claims, 15 Drawing Figures

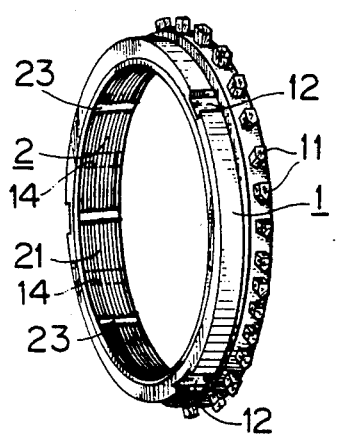
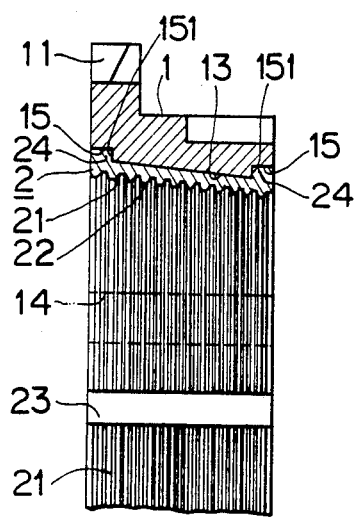
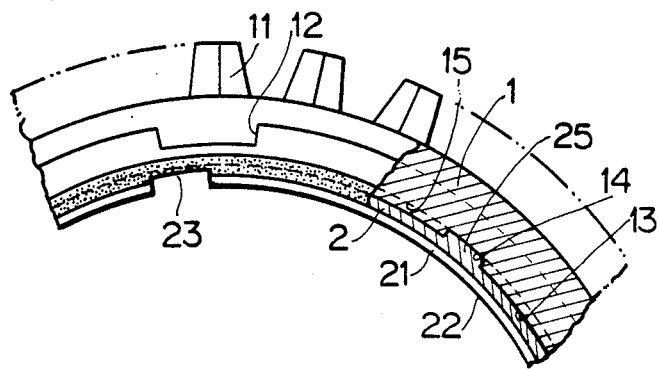
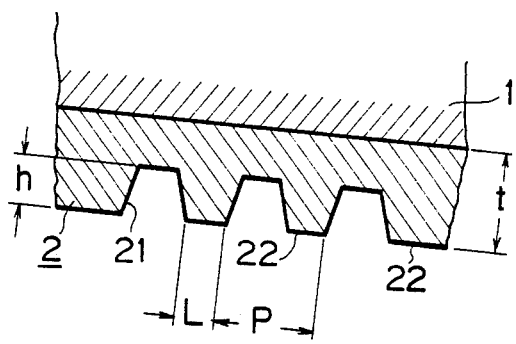
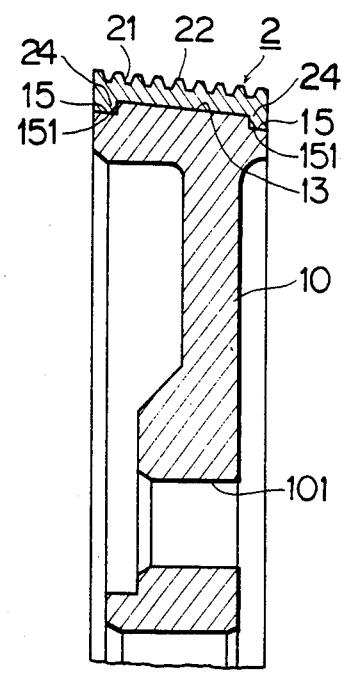
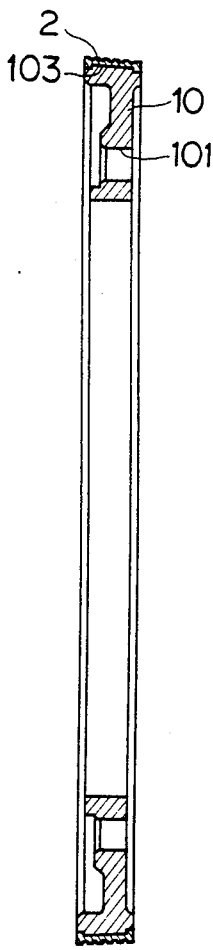

FIG_7
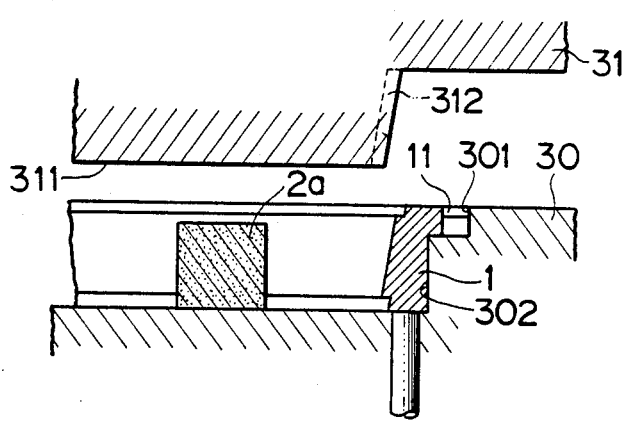
FIG_8
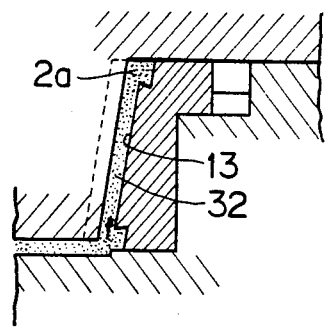
FIG_9
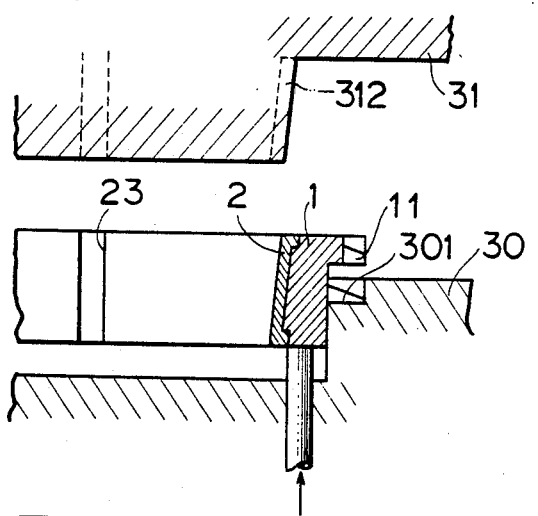
FIG_10
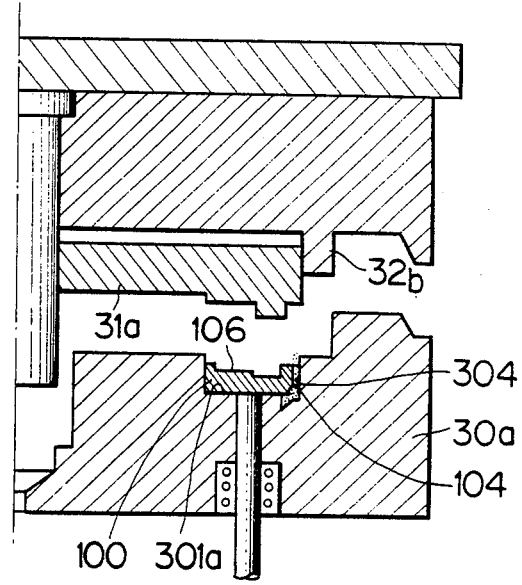
FIG_11
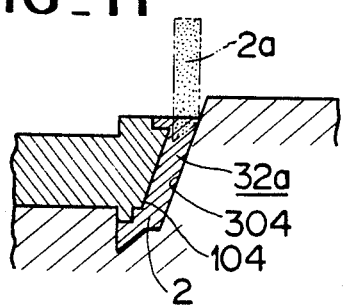

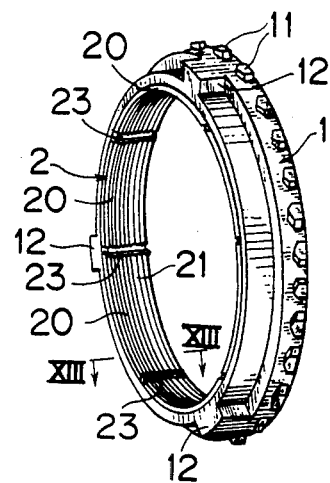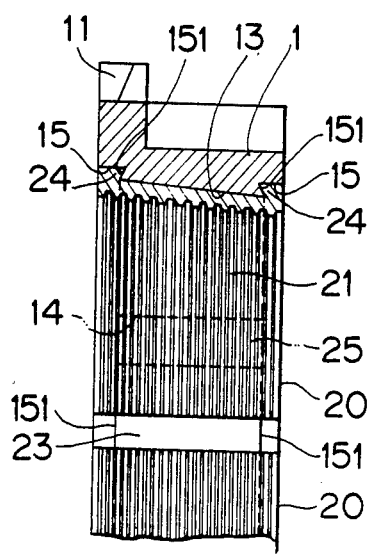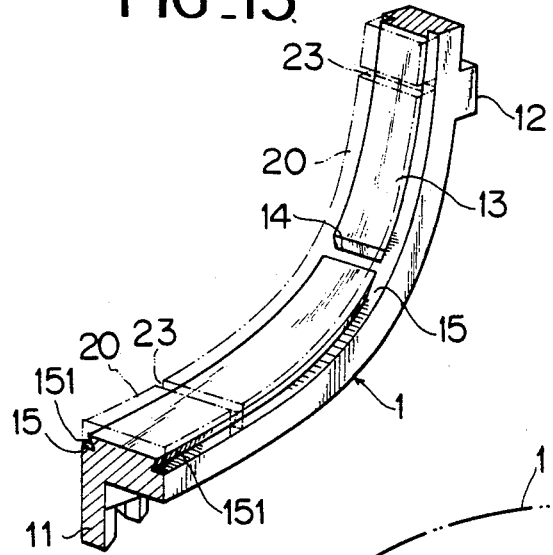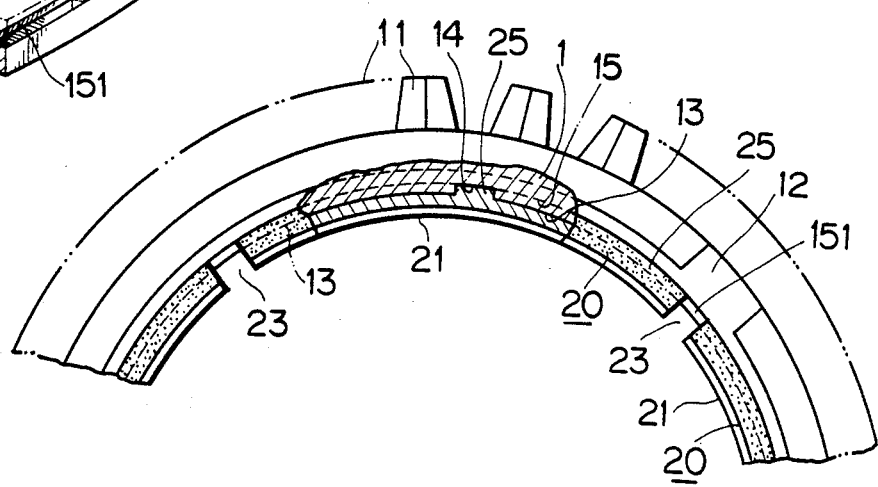

SYNCHRONIZER RING IN VEHICLE SPEED CHANGE GEAR

BACKGROUND OF THE INVENTION

The present invention relates to a synchronizer ring in a vehicle speed change gear, especially in a synchronizing speed change gear.

The synchronizing speed change gear is provided with a synchronizer ring axially movable between a gear and a connecting sleeve, and synchronizes the circumferential speed of the both before gearing the connecting sleeve and the gear.

A Warner type of the synchronizer ring has a spline on an outer diameter part thereof and a conical surface on an inner diameter part, which engages by friction a conical surface of the gear. On the other hand, a pin type of the synchronizer ring is reversed in positions of the conical surface of the gear and the radius direction of the spline, and the other diameter part is formed with the conical surface for friction-gearing the conical surface of the synchronizing outer ring of the gear.

With respect to the synchronizer ring, a special high tension brass has been conventionally employed for blank material, and forged to form spline and a conical surface, and processed on the conical surface with grooves of fine and high precision. Unfortunately, the blank material is expensive and difficult to process, and the production cost is very high at low productivity. There is another synchronizer ring where the whole body is made of a ferrous metal and the conical surface is coated with molybdenum. This structure is also unavoidably expensive in the production cost.

For use, when the mutual slidings are large or when difference in mutual rotations is large, the above mentioned former special high tension brass causes plastic flow due to friction heat in addition to scratch abrasion. The latter ferrous metal causes defects by attacking, shocks and others, since the abrasion resistibility of the molybdenum layer is too high for the conical surface of the gear. Therefore, the synchronizing durability is poor, and especially as low viscosity of the gear oil and high power of the engine have advanced nowadays, the abrasion of the conical surface has been severe and the above said inconvenience has been accelerated, accordingly.

There is a further synchronizer ring where the conical surface of the ring body is applied with fibrous (porous) paper material. However in this synchronizer ring, the paper material fabricating the friction surface and the ring body are independently manufactured, and after then they are combined. Therefore, the undermentioned defects appear.

For manufacture, this ring requires processes of; preparing a sheet paper material by adhering friction increasing powders such as red oxide of iron, calcium carbonate or the like to the cellulose fiber; cutting such a treated sheet paper to form a determined lining shape (ring shape); making the conical surface of the ring body on which the adhering agent is coated; pressing and adhering the ring shaped paper material; and grinding this adhered paper material. As is seen, many processing steps are involved in manufacturing, so that this kind of synchronizer ring is also expensive.

In view of the facility, the production requires a means of dispersing the cellulose fiber in the water at a determined density, a hot blast stove, a process from the sheet paper base to the lining material, a roll for adhering it to the ring body, and pressure. These steps invite the high cost, too.

Further, the paper material is adhered to the ring body where the paper material is separately prepared, and securing force is much unbalanced due to quality and quantity of the used binder and the observation of its thickness is difficult. The lubricant goes between the paper material and the ring body because of porosity of the paper. Particularly, if the lubricant were heated at the high temperature or the product were used in the geographical hot field, the paper material would be exfoliated. Besides, the paper material is expanded by adhering the lubricant so that it bites the conical surface of the object when synchronization is finished. Since the paper material is weak in strength, it easily invites pitching abrasion by shock. The connical surface of the paper material becomes carbonized by using it for a long period of time, and the friction coefficient becomes changed at the starting time. Because of these causes, stabilization of the synchronization is poor and the operation is not smooth.

SUMMARY OF THE INVENTION

In view of the above circumstances, the present invention is to provide a synchronizer ring which has satisfactory abrasion resistibility and friction characteristics, and may guarantee a stable synchronizing durability for a long period. The synchronizer ring of the invention is simple in structure and may be produced in lesser processings.

In addition, this invention is excellent in exhausting the lubricant, enables to have fine elastic deformation by large width of toplands, and reduces pressure subjecting to the surface. Therefore, although the contacting to the conical surface of the object gear is small, a well conditioned friction coefficient may be displayed, so that the stable synchronizing durability may be obtained. The biting to the object is not caused at the finishing of the synchronization, and smooth operation is promised.

The novel features which are considered as characteristic for the invention are set forth ib particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view showing one example (the Warner type) of a synchronizer ring according to the present invention;

FIG. 2 is a cross sectional view, partially in section, of the above;

FIG. 3 is a partially enlarged view of FIG. 1;

FIG. 4 is a partial front view of FIG. 1;

FIG. 5 is a cross sectional view of another example (a pin type) according to the present invention;

FIG. 6 is a partially enlarged view of the above;

FIG. 7 to FIG. 9 are cross sectional views showing stepwise a metal mold for manufacturing the synchronizer ring and a manufacturing condition;

FIG. 10 is a partial cross sectional view showing a metal mold for manufacturing the synchronizer ring shown in FIG. 5;

FIG. 11 is a partially enlarged view of FIG. 10;

FIG. 12 is a perspective view showing a further example of a synchronizer ring according to the invention;

FIG. 13 is a cross sectional view along XIII-XIII of FIG. 12;

FIG. 14 is a partial front view of FIG. 12; and

FIG. 15 is a partial perspective view showing a resin formed layer with phantom line.

DETAILED DESCRIPTION OF THE PREFERRED EMBODIMENTS

The invention will be discussed in reference to embodiments illustrated in the attached drawings.

FIGS. 1 to 4 and FIGS. 12 to 15 respectively show embodiments applying the invention to a synchronizer ring of a Warner type, which comprises a ring body 1 and a resin layer 2 formed integrally with the ring body 1. The ring body 1 is made of an appropriate material such as copper alloy, ferrous metal, aluminium alloy or the like. The ring body 1 is formed with involute splines 11 on a half part of an outer circumference thereof for gearing a clutch gear not shown and defined with securing concaves or convexes 12 on the other half part. On the other hand, the ring body 1 is defined with a conical clutch 13 on the inner side thereof for meeting a conical clutch of a gear such that a space is formed therebetween. The conical clutch 13 may be, in this invention, rough on the surface and permit minor sizing errors.

The resin formed layer 2 is directly attached to the surface of the conical clutch 13 without an adhering agent. This layer 2 is non-porous and parallel in obliquity with the surface of the conical clutch 13.

The resin formed layer 2 is composed of resin of high friction coefficient, friction coefficient controlling material and a filler, having a thermosetting nature. The resin per se is excellent in mechanical strength and heat resistance, and further the resin is stable in sizing, excellent in long life and weather resistance. The resin is selected from phenol resin, urea resin, epoxy resin, unsaturated polyester resin, diallylphthalate, polymide resin, silicone resin and others.

As the friction coefficient controlling material, the invention employs vitreous material of a fibrous or powder nature. This material increases the strength, heat resistance and sizing stability of the resin formed layer, provided that the coating amount to the resin is within 10 to 40 wt%. If it were less than 10 wt%, the satisfactory friction characteristics and the abrasion resistibility could not be displayed. However, if it were more than 40 wt%, the friction coefficient would be lowered, since the precipitation amount on the surface is excessive so that the contacting area to the conical surface of the object is decreased. In addition, the strength is lowered and the formability is deteriorated. As the friction coefficient controlling material, asbestos could be used, but it is not preferable in view of the air pollution. The fillers are wooden powders or cloth pieces. Much addition invites decrease of the strength, and not more than 70 wt% will be suitable.

For the friction coefficient controlling materials, examinations were made on metals such as high tension brass or steel, fibers or powders of ceramics, and it was found that bad synchronizing function arose due to segregation, or cracks caused in the parts of the resin by the difference in the thermal expansion coefficient in relation with the parts of the resin. Besides, the formability is inferior, and the friction coefficient controlling material is caught at a gate during formation. This invention is advantageous in these points.

The above mentioned resin formed layer 2 is threaded with a screw groove 21 in a circumferential direction, and toplands 22 between pitches of the screw groove 21 gear the conical clutch of the gear with friction. Grooves 23 are equidistantly defined in an axial direction in crossing with the screw groove 21. According to the invention, the screw groove 21 has pitches P between 0.5 mm and 2.0 mm and the width L of the topland between 0.2 mm and 1.5 mm. The tolerance may be rough and does not need severe condition such at ±0.01 to 0.10 mm as required in the special high tension brass.

Reasons for defining the pitches of the screw groove 21 and the widthes of the toplands 22 in the special range as said above, are because if they are composed of the resin formed layer 2 containing vitreous material on the friction faces thereof, they may be well balanced in displaying the friction characteristics and the abrasion resistance.

That is, if the resin formed layer 2 were not defined with the screw groove at all, the lubricant existing between the conical surface and the conical surface of the gear could not be exhausted, and the operation could not be performed smoothly because of no generation of the friction coefficient. If the pitch of the screw groove were 0.3 to 0.4 mm as required in the special high tension brass and the width of the topland were 0.08 to 0.12 mm, biting to the object would be easily caused because the friction coefficient is too high, and processing of such sizes would be difficult. Reversely, if the pitch of the screw groove were made rough more than 2.5 mm and the width of the topland were made larger than 1.8 mm, the number of the screw would be lesser and the lubricant would be unsatisfactorily exhausted so that the necessary friction coefficient could not be obtained.

Thickness (t) of the resin formed layer 2 is in general preferable in about 0.5 to 3 mm. Because, if being less than 0.5 mm, cracks would be caused in the resin formed layer due to threading the screw, but if being too thick, the effect of the above mentioned screw groove would be lost.

The grooves 23 in the axial direction are for guiding outsides the lubricant flowing toward the screw groove 21, and their numbers are not limited, but preferably they are four to ten formed equidistantly. The depth of the groove is made larger than the screw groove 21, e.g., 0.5 to 2 mm. The screw groove 21 and the axial grooves 23 may be defined at the same time as forming the covering of the resin formed layer 2, or may be formed by processing the race after forming and covering.

In the embodiment as seen in FIGS. 1 to 4, the axial groove 23 does not reach in its depth the surface of the conical clutch 13. Therefore the resin formed layer 2 seems like to form a continuous ring. On the other hand, in the embodiment as seen in FIGS. 12 to 15, the axial groove 23 reaches in its depth the surface of the conical clutch 13, and this surface is exposed by the width of the groove. Therefore, the resin formed layer 2 are composed of a plurality of curved segments 20 which is divided by the axial grooves 23.

The resin formed layer 2 is made integral with the ring body 1 without the adhering agent, and for providing more fixture therebetween, the ring body 1 is, as shown in FIGS. 2 and 4 and FIGS. 12 to 15, formed on its conical clutch 13 with concaves 14 extending in the axial direction equidistantly as well as formed thereon with concaves (engaging steps) 15 in the circumferential direction and crossing with said concaves 14. The resin formed layer 2 is made to enter these concaves 14, 15 so that engagements 25, 24 are provided which do not need any special processing, since they are formed at the same time when the resin formed layer 2 is coated with lining.

Due to the engagement between the circumferntial concaves 15 and the engaging steps 24, the resin formed layer 2 extends over the conical clutch 13 between the steps 24 as seen in FIGS. 2 and 13, thereby preventing slipping in the axial direction. Standings 151 continuing from the concave 15 to the clutch 13 may be a right angle as shown in FIG. 2, or may be tapered as shown in FIG. 13.

The concave 14 and the engaging step 25 are for preventing the resin formed layer 2 from slipping in the circumferential direction. It is desirable to define one couple thereof between the axial grooves 23, especially at the center therebetween and the concave 14 should reach up to the level of the circumferential depression.

In the case of the embodiment shown in FIGS. 12 to 15, said one couple is positioned at a part corresponding to the center of the curved segment divided by the axial grooves 23.

The resin formed layer 2 is as shown composed of a plurality of the curved segments 20 divided by the grooves 23, and the segment 20 is defined with the concave 14 in the conical clutch portion corresponding to the central part in length of the segment 20, and the engaging step 25 being convex is set into the concave 14. Such an embodiment has merits as follows. The present invention employs the thermosetting resin to which the filler such as the vitreous material or the wooden powder is added, however, cracks are easily created because of the nature of the thermosetting resin. This is why the thermal expansion coefficient is largely different in the resin and the ring body 1, so that different stresses are caused thereby. During production of the synchronizer ring or incorporation into the reduction gear, the resin formed layer 2 is easily cracked. While producing (forming), shrinking temperatures are different in the ring body 1 and the resin formed layer 2, and since the shrinking amount of the resin is large, residual stress is generated which is a cause of cracking. On use, the resin formed layer 2 is heated by friction with the object cone or cooled. By repetition of heating and cooling, stress is caused due to difference in temperature and invites cracks.

In the present invention, the curved segments 20 are secured at the center of their rear by means of the axial depression 14 and the engaging step 25, but the both sides of each of the segments is freely shrinked by the axial grooves 23. In addition, since the circumferential depressions 15 and the standings 151 play roles of guide rails, the resin formed layer 2 is never slipped from the ring body 1.

Therefore, the stress due to the difference in the thermal expansion coefficient between the resin and the metal, may be automatically absorbed, so that cracks are not created in the resin formed layer 2 during production or use of the synchronizer ring, and the effect displayed by the circumferential groove 21 may be displayed for a long time.

FIGS. 5 and 6 illustrate an embodiment which applies the present invention to a synchronizer ring of the pin type. A ring body 10 has three to six pin holes 101 to be connected to the sleeve by means of synchronizer guide pins, and is defined on the outer circumference with a conical clutch 103 against the conical clutch of the outer synchronizer ring. The conical clutch 103 is directly provided with lining of the resin formed layer 2 scattering vitreous matter. The resin formed layer 2 is defined with a screw groove 21 and toplands 22 in the circumferential direction and with grooves 23 running in the axial direction. The composition of the resin formed layer 2, the pitch of the screw groove, the topland, and the composition of the concaves 14, 15 and the engaging parts 25, 24 are the same as those of the Warner type.

Since the synchronizer ring of the pin type is made larger in the diameter of the oblique surface, it is used for synchronizing mechanisms of large capacity, such as motorbuses, trucks or the like. If this invention is applied to them, it is possible to largely reduce the cost and increase the faculty of the synchronizing durability.

The process of providing the synchronizer ring according to the invention is undertaken by producing the ring body 1 through forging, casting or race processing, applying the ring body 1 into a multiple mold, and directly forming the resin containing the vitreous substance in a forming mold of the conical clutch of the ring body 1, whereby the resin formed layer 2 is integrally formed with the ring body 1. The resin formed layer 2 is formed by injection molding, transfer molding or compression molding.

FIGS. 7 to 9 show the process of producing the synchronizer ring of the Warner type by compression molding. A female mold 30 is defined with a concave of an involute spline type for fitting an involute spline 11, while it is also defined with a concave ring wall 302 contacting the outer diameter of the ring body 1, continuing from the concave 301. A male mold 31 is provided with a projection 311 such that a fine flow passage is formed in relation with the inner bottom of the female mold 30, and a determined cavity 32 is, as seen in FIG. 8, formed between the circumference of the projection 311 and the conical clutch of the ring body 1 to be fitted in the female mold 30. In this embodiment, since the axial groove is formed at the forming time of the synchronizer ring and the circumferential groove is formed at the post-forming, projections 312 for forming the axial grooves are formed on its outer circumference with determined spaces.

The ring body 1 instantly aligns the metal mold by the involute concave 301. The female mold 30 is provided on its bottom with a bar or block like resin piece 2a which has been in advance mixed with the vitreous substance of the friction coefficient controlling material, into which the male mold 31 is moved down. The male and female molds 31 and 30 are heated to the desired temperature by a heater. The resin piece 2a flows into and clogs the cavity by urging the projection 311 of the male mold 31. Thus, the resin formed layer 2 having the axial groove 21 is provided and is combined with the ring body 1 at the same time. After the resin is solidified, the male mold 31 is removed and a knockout pin is moved up to take it out from the metal mold. The circumferential groove is formed by the race process, and the synchronizer ring is produced.

FIGS. 10 and 11 show a metal mold for producing the synchronizer ring of the pin type. A female mold 30a is formed with a concave ring 301a for fitting a ring body 100, and a cavity 32a is formed between an outer wall 304 of the concave ring 301a and a conical clutch 104 of the ring body 100, into which is filled a ring like pellet or half molten resin piece 2a mixed with the vitreous substance. Subsequently, an inner male mold 31a is mounted on a concave 106 of the ring body 100, and a heated outer male mold 32b slides down along the inner male mold 31a, so that the resin piece 2a of the cavity 32a is compressed and clogs the cavity, and a synchronizer ring formed with a resin layer is produced.

EXAMPLES

I. Warner synchronizer ring as shown in FIGS. 1 and 12 was made by the compression molding in accordance with the invention. The composition was prepared with the vitreous material of 20 wt% for the friction coefficient controlling material, the wooden powder of 40 wt% for the filler and the rest of phenol resin, and the pellet of 4 mm in diameter was produced. A ring body of 105 mm in the central diameter of the conical clutch was made of the special high tension brass (SAMPLES A-F), and low alloy steel (SAMPLE J) was mounted on the metal mold. The conditions for making the resin formed layer are a heating temperature of 190° C., a heating time of 60 sec and a pressure of 30 ton.

In such a way, the resin formed layer of 2 mm in thickness was provided on the outer circumference of the ring body. The circumferential depression of the ring body was 2 mm in left and right widths, and the height of the standing was 2 mm, and the axial depression was spaced by 60° with a depth of 2 mm and a width of 4 mm. The screw grooves of SAMPLES A-E and J were formed on the surface of the resin formed layer via the race process. The pitch and the width of the toplands are shown in Table 1. With respect to the axial grooves, the phases in all of the SAMPLES are shifted by 60° so that the axial depression is positioned between the two axial grooves. The axial grooves of SAMPLES A-F are determined to be 0.8 mm in depth and 2.5 mm in width. In SAMPLE J, the axial groove has a depth equal to the thickness of the resin formed layer and a width of 4 mm.

TABLE 1

| SAMPLES | Pitches of screw groove | Width of toplands | Depth of screw groove |
| --- | --- | --- | --- |
| A | 0.5 mm | 0.2 mm | 0.2 mm |
| B | 1.2 mm | 0.4 mm | 0.4 mm |
| C | 2.0 mm | 0.5 mm | 0.4 mm |
| D | 0.3 mm | 0.10 mm | 0.4 mm |
| E | 2.5 mm | 2.0 mm | 0.4 mm |
| F | Non | Non | Non |
| J | 0.9 mm | 0.25 mm | 0.4 mm |

II. SAMPLES A to F were incorporated in the synchronizer gearing mechanism of the pin type for the large sized truck, and tested in the synchronizing durability of 150,000 limit under the reduction condition of 3rd-4th, the operation of 100 Kg and the rotation number of 2100 rpm. With respect to SAMPLE J, the durability tests were made 300,000 times. The trial manufactures were made with the same conditions on the synchronizer ring (SAMPLE G) of the high tension brass (the same outer diameter, a pitch of 0.3 mm of the screw groove and a width of 0.10 mm of the topland), the synchronizer ring (SAMPLE H) having the resin formed layer without the screw groove, added to the resin with the high tension brass powder (48 mesh in average) of 33 vol% as the friction coefficient controlling material, and the synchronizer ring (SAMPLE I) coated with the lining made of paper.

III. The results are as shown in Table 2.

TALBE 2

| SAM-PLES | Friction coefficient | DURABILITY Durable number | DURABILITY Causes | DURABILITY Abrasion (mm) | Contact ratio (%) Before test | Contact ratio (%) After test |
| --- | --- | --- | --- | --- | --- | --- |
| A | 0.12 | 150000 | — | 0.15 | 60 | 65 |
| B | 0.13 | 150000 | — | 0.12 | 35 | 30 |
| C | 0.12 | 150000 | — | 0.19 | 40 | 30 |
| D | 0.06 | 51000 | Defect in screws | 0.32 | 60 | 10 |
| E | 0.05 | NG at starting | *** | 0.02 | 60 | 60 |
| F | 0.04 | NG at starting | *** | 0.02 | 50 | 50 |
| G | 0.06 | 85000 | Slipping | 0.28 | 70 | 80 |
| H | 0.06 | 92000 | Slipping | 0.21 | 70 | 60 |
| I | 0.06 | 53000 | Slipping | 0.28 | 70 | 30 |
| J - 1 | 0.12 | 300000 | — | 0.15 | 35 | 30 |
| J - 2 | 0.12 | 300000 | — | 0.17 | 40 | 35 |

Note:
***Too low friction coefficient
NG No good
Contact ratio Contact ratio between the corn face of the clutch gear and the face of the synchronizer ring It is seen from Table 2 that SAMPLES A, B and C of the invention have satisfactory abrasion resistibility and excellent synchronizing durability. Besides, in SAMPLES J-1 and J-2, better durability is obtained. This is why the curved segments absorb stress which is caused by the difference in the thermal expansion coefficient, and prefectly exclude crackings by the heating cycle.

As having mentioned above, according to the invention, such synchronizer rings may be provided which have the satisfactory abrasion resistibility and friction characteristics, and may promise the synchronizing durability stable for a long period. The synchronizer ring of the invention is simple in structure and may be produced in lesser processings at cheaper cost, since the surface of the clutch is permitted to be rough so that the gears may be easily produced.

What is claimed is:

1. A synchronizer ring in a vehicle speed change gear, comprising
    a ring body having an axis, a circumference and a clutch surface; and
    a resin formed layer disposed on said clutch surface of said ring body and having a circumferential groove extended in a direction of said circumference of said ring body and an axial groove extending in the direction of said axis of said ring body, said circumferential and axial grooves crossing each other, said circumferential groove having a pitch in the range of 0.5 to 2.0 mm, a topland width in the range of 2.0 to 1.5 mm, and said axial groove having a depth that does not reach said clutch surface of said ring body but instead ends before it reaches said clutch surface of said ring body.

2. A synchronizer ring in a vehicle speed change gear, comprising
    a ring body having an axis, a circumference and a clutch surface; and
    a resin formed layer disposed on said clutch surface of said ring body and having a circumferential groove extended in a direction of said circumference of said ring body and an axial groove extending in the direction of said axis of said ring body, said circumferential and axial grooves crossing each other, said circumferential groove having a pitch in the range of 0.5 to 2.0 mm, a topland width in the range of 0.2 to 1.5 mm, and said axial groove having a depth that reaches said clutch surface of said ring body.

3. A synchronizer ring in a vehicle speed change gear, comprising
   a ring body having an axis, a circumference and a clutch surface; and
   a resin formed layer disposed on said clutch surface of said ring body and having a circumferential groove extended in a direction of said circumference of said ring body and an axial groove extending in the direction of said axis of said ring body, said circumferential and axial grooves crossing each other, said clutch surface of said ring body having a plurality of circumferential concave and a plurality of axial concave, said circumferential concave extending along said circumference of said ring body and said axial concave extending in the direction of said axis of said ring body, said circumferential and axial concave crossing each other.

4. The ring as defined in claim 1, wherein said resin formed layer contains a vitreous substance that directly covers said clutch surface of said ring body.

5. The ring as defined in claim 1, wherein said resin formed layer is composed of vitreous material in the range of 10 to 40 wt %, filler in the range of 10 to 70 wt %, and the remaining of thermosetting resin.

6. The ring as defined in claim 5, wherein said vitreous material is vitreous fiber.

7. The ring as defined in claim 5, wherein said vitreous material is vitreous powder.

8. The ring as defined in claim 5, wherein said filler is wooden powder.

9. The ring as defined in claim 5, wherein said filler is fabric.

10. The ring as defined in claim 3, wherein said ring body has a circumference in which said axial concaves are equidistantly formed.

11. The ring as defined in claim 3, wherein said resin formed layer is fixed in said axial concaves of said clutch surface of said ring body, and each of said axial concaves is formed in slipping off the axial depression.

12. The ring as defined in claim 1, wherein said resin formed layer is directly formed following said clutch surface of said ring body by multiple molds fitting the circumference of said ring body and being connected to said clutch surface.

* * * * *